Jan. 9, 1962 R. R. WAREHAM ETAL 3,016,175
SHEET-ARRESTING MECHANISM FOR PHOTOGRAPHIC APPARATUS
Filed Jan. 31, 1958 3 Sheets-Sheet 1

INVENTORS
Richard R. Wareham
and
BY Otto E. Wolff
Brown and Mikulka
ATTORNEYS

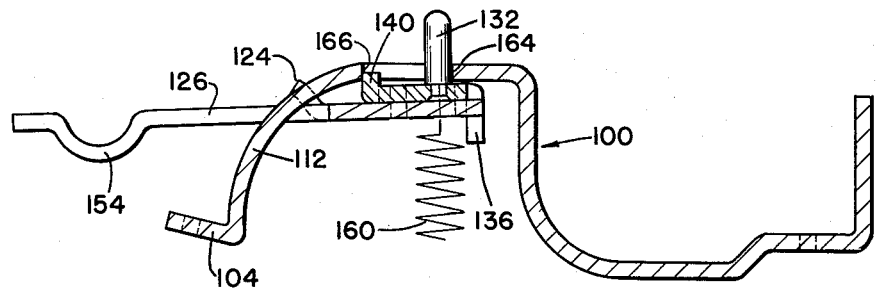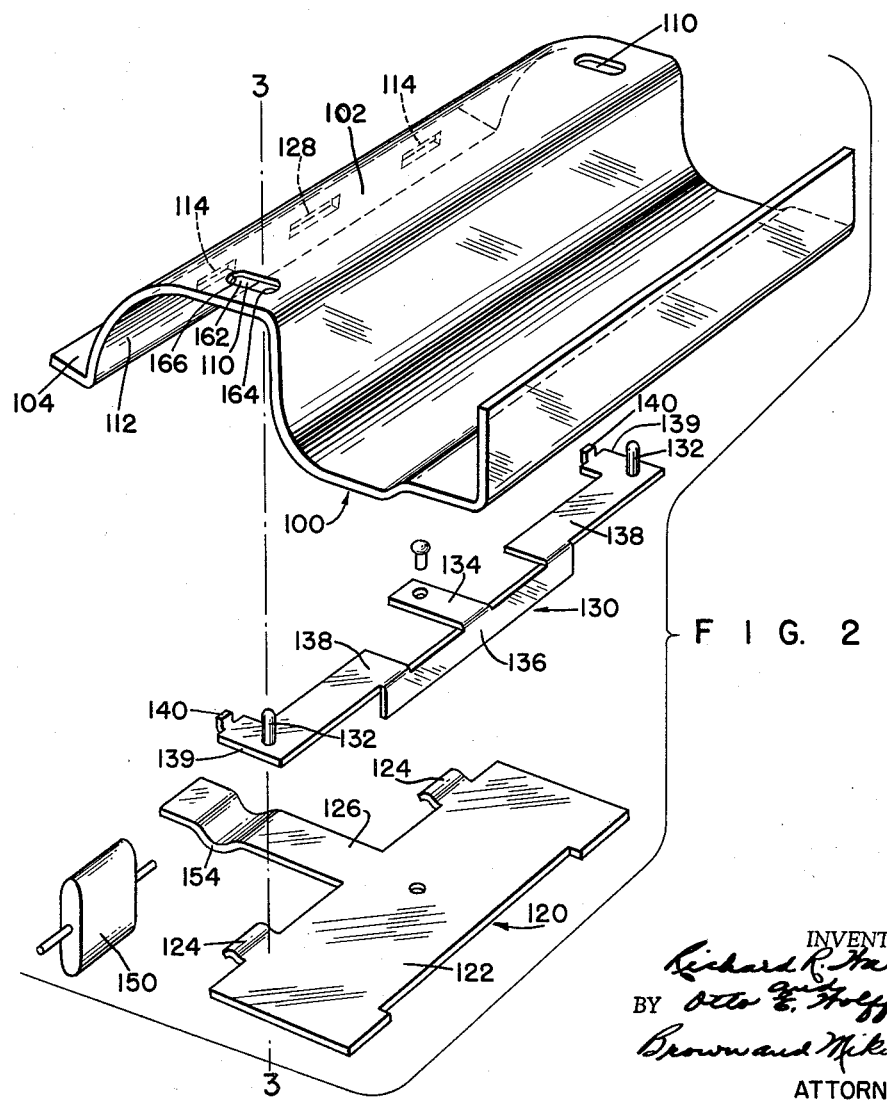

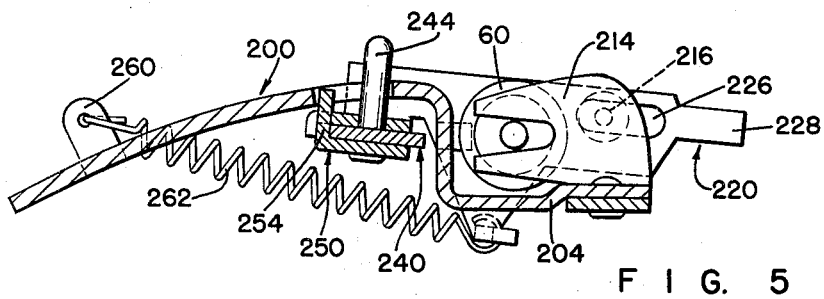
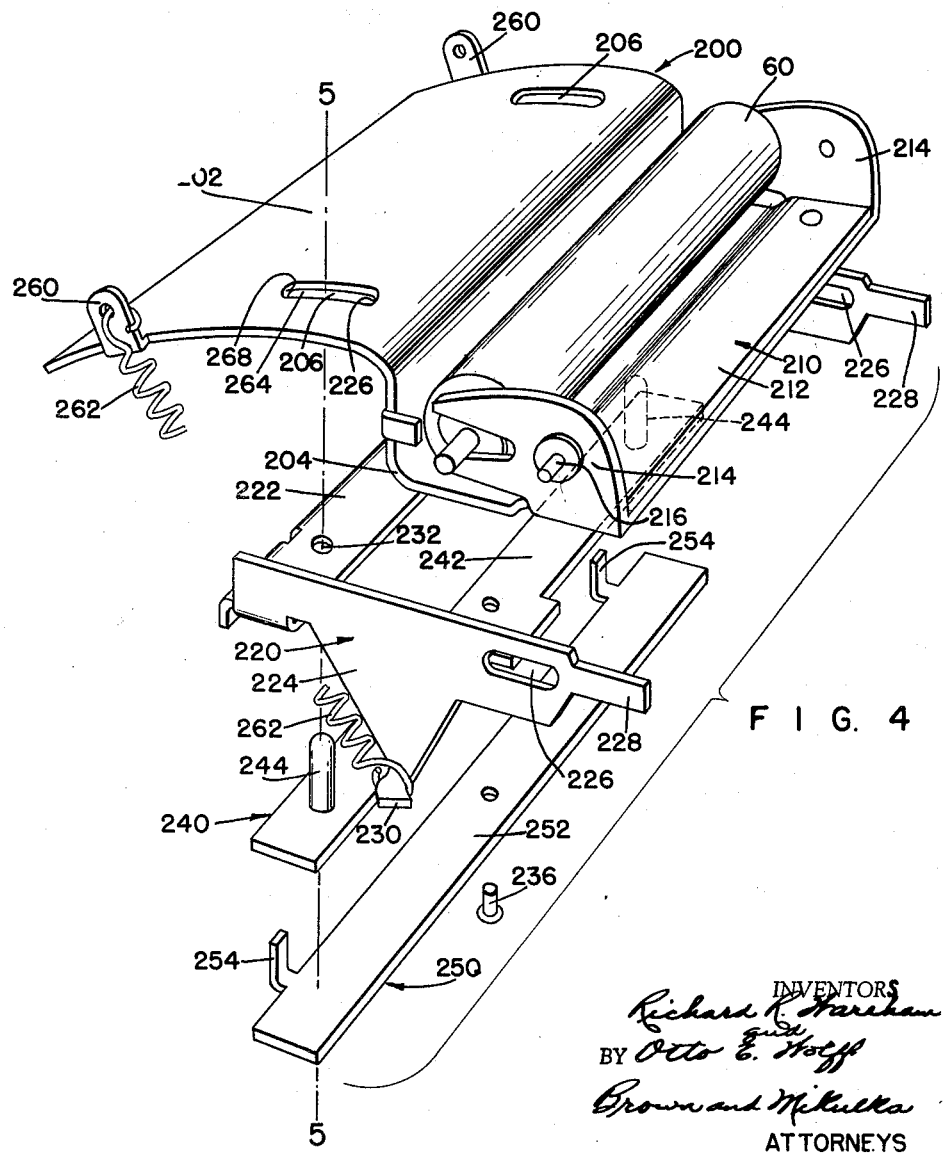

Patented Jan. 9, 1962

3,016,175
SHEET-ARRESTING MECHANISM FOR PHOTO-GRAPHIC APPARATUS
Richard R. Wareham, Marblehead, and Otto E. Wolff, Weston, Mass., assignors to Polaroid Corporation, Cambridge, Mass., a corporation of Delaware
Filed Jan. 31, 1958, Ser. No. 712,544
10 Claims. (Cl. 226—58)

This invention relates to photography and particularly to improvements in a mechanism for arresting movement of sheet material advanced through photographic apparatus.

There have been proposals to provide mechanisms for arresting movement of sheet materials advanced through photographic apparatus such as the sheet arresting mechanisms disclosed in U.S. Patent No. 2,543,159, issued February 27, 1951 to Murry N. Fairbank, in U.S. Patent No. 2,740,340, issued April 3, 1956 to Herbert A. Bing et al., and in copending application Serial No. 472,746, filed December 2, 1954 by John W. Lothrop et al., now U.S. Patent No. 2,843,029. Mechanisms, as disclosed therein, include at least one stop member adapted to engage successive regularly spaced and engageable portions of the sheet material as the latter is advanced and an engageable portion thereof becomes aligned with the stop member. The stop member is mounted on resilient means so as to be movable in a plurality of directions and is normally urged into engagement with sheet material and in a direction opposite the direction of movement of the latter. As the stop member becomes engaged by a portion of the sheet material, it is moved therewith against the bias of the resilient mounting means until its movement, and that of the sheet material, are arrested by means defining the limit of movement of the stop member. To permit continued predetermined advancement of the sheet material, the stop member is movable in a direction substantially normal to the direction of movement of the sheet material out of engagement with the engageable portion thereof. Upon withdrawal from engagement with the sheet material, the stop member moves under the bias of its mounting means in a direction opposite the direction of advancement of the sheet materials. By virtue of this arrangement, only a momentary withdrawal of the stop member is required to permit it to return to a position wherein it is adapted to engage the next successive engageable portion of the sheet material advanced into alignment with the stop member. The release means may take the form of a push button or the like for pivoting the means on which the stop member is mounted.

In cameras of the type wherein a photosensitive sheet is exposed and thereafter processed, a photosensitive sheet may be superposed with a second sheet and these sheets advanced between a pair of pressure-applying members, preferably rollers, for spreading a processing composition in a layer between the sheets. The photosensitive sheet preferably comprises a suitable base and a suitable photosensitive layer, said layer, for example, may be composed of a silver halide emulsion and is provided with a succession of frames adapted to receive a succession of latent images upon exposure to actinic light. One of the sheets may comprise, in addition to portions adapted to engage the stop member, means for collecting any excess of processing compositions spread between the sheets. These collecting means, disclosed in U.S. Patent No. 2,686,717, issued August 17, 1954 to Edwin H. Land, due to their thickness, cause an added resistance to movement of the sheets as they are advanced between the pressure-applying members. In order to reduce this added resistance and thus provide for a smoother advancement of said sheets, it has been suggested that the rollers may be ball-bearing mounted. The sheet materials advanced through the rollers are initially disposed in the camera in the form of rolls of sheet material, and as such, have a natural resiliency.

The combination of this natural resiliency of the roll, the lowered frictional coefficient of the suggested ball-bearing roller mounting means, in addition to the resilient biasing of said stop member, may result in a return movement of the stop member and sheets to the position at which the stop member had first engaged said portions of said sheet. After withdrawal of the stop member from engagement with the sheet material, the stop member will tend to re-engage the same portion of sheet material. Any attempt by the operator believing the sheet to be disengaged will possibly result in tearing. While the stop member disclosed in the application and patents heretofore cited has proved essentially satisfactory, a solution is needed to the problem imposed by the suggested insertion of roller bearings in the pressure-applying members. Accordingly, objects of the present invention are to provide in a photographic apparatus, comprising a housing defining a path through which a sheet is adapted to advance, improved means for arresting advancement of said sheet; to provide a stop means for arresting advancement of a sheet that has a succession of marginal perforations, said stop means comprising at least one stop member adapted to engage at least one of said perforations, means for releasably holding said stop member in a locked position of engagement with said perforation in said sheet, manually operable means for disengaging said stop member from said perforation, means responsive to operation of said disengaging means for repositioning said stop member for engagement with the next successive one of said perforations.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 2 is an exploded, perspective view of the parts of the embodiment of the invention as shown in FIGURE 1;

FIG. 3 shows a side elevation in section of the parts of FIG. 2 assembled, the sectional view being taken along line 3—3 of FIG. 2;

FIG. 4 is a diagrammatic, expanded perspective view of the parts of another embodiment of the invention; and FIG. 5 is a side view in section of the parts of FIG. 4, assembled, taken along the line 5—5 of FIG. 4.

Figure 1:
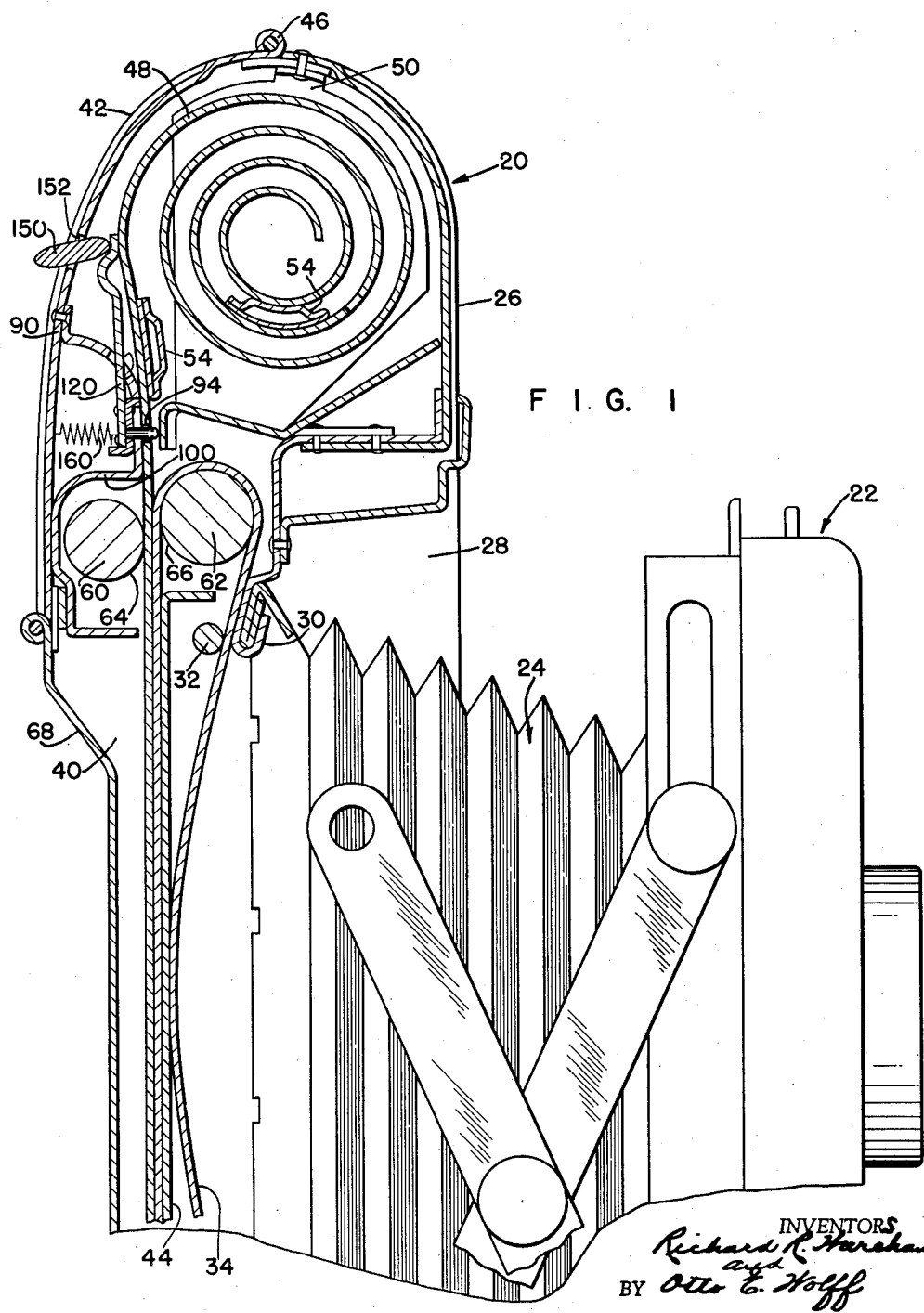
FIGURE 1 is a fragmentary side elevational view, partially in section, taken substantially of a camera illustrating one embodiment of the invention with sheet materials mounted therein.

The sheet arresting mechanism of the invention is particularly suitable for embodiment in photographic apparatus of the type heretofore mentioned, which embodiment generally includes use in a camera wherein two sheet materials, one of which is photosensitive, are individually mounted for manual advancement and are guided from separate portions of said camera to a superposed position wherein said sheets are passed between pressure-applying members to spread a thin layer of processing composition between said sheets. As these sheets are advanced in superposed relation between said pressure-applying members, processing composition is ejected from a rupturable container. Said composition is spread in a thin layer between said sheets, thereby forming a sandwich which may be advanced into a portion of the camera such as a processing chamber. Stop means are provided for arresting advancement of said sheet when a particular area of the photosensitive sheet, such as an exposed frame, and a corresponding image-receiving area superposed on said frame, have passed entirely between the pressure-applying members and into the processing chamber. The sandwich may remain within said processing chamber for a predetermined period of time during which a positive print is formed in said image-receiving area with which said exposed frame is superposed. At the end of the predetermined processing period, the processing chamber may be opened and the developed positive print may be removed. After exposure of another frame of the photosensitive material, the sheet materials may be advanced until said other frame of the photosensitive material and a corresponding image-receiving area registered therewith have again entirely passed through the pressure-applying members and into the processing chamber, said frame being then arrested by the stop means.

Referring now to the drawings wherein like numerals denote like parts, there is shown in FIG. 1 a fragment of a simple handheld camera of the folding type heretofore mentioned which includes an embodiment of the invention. As a means for enclosing and supporting the various elements of the camera, a housing 20 is provided. A fragment of a suitable lens and shutter assembly 22 is shown attached to housing 20 by means of the usual extensible bellows 24. Housing 20 comprises a front portion 26 having a light-transmitting aperture 28 therein. Aperture 28 also has guide surfaces 30 on either side thereof (only one being shown), on which surfaces 30 may be positioned portions of a photosensitive sheet for exposure, thus providing an exposure frame. A suitable means such as a guide roller 32 may be provided adjacent one side of aperture 28 to hold photosensitive sheet 34 in the exposure frame. Sheet 34, adapted for exposure and processing within the camera, is advanceable from the exposure position to a processing chamber 40 defined between rear portion 42 and intermediate portion 44 of housing 20. In FIG. 1, rear portion 42 is pivotally attached to the upper extremity of front portion 26 by hinge means 46, intermediate portion 44 being attached to the lower extremity of front portion 26 by other hinge means (not shown), it being understood that a latch (not shown) is employed at said lower extremity for holding the various portions in a closed position. Such pivotal mounting of the housing portions provides ready access to the interior of housing 20 for disposition of sheet materials 34 and 48.

A second sheet 48, in conjunction with which photosensitive sheet 34 may be processed, is releasably contained in housing 20 as at 50 in the form of a loose roll of material. Second sheet 48 preferably comprises a suitable base and a suitable image-receiving layer on one side of said base, said layer comprising any one of the compositions adapted to receive positive prints of the latent images impressed on frames of photosensitive sheet 34 by exposure to actinic light.

A plurality of containers, one of which is designated generally at 54 are affixed to the image-receiving surface of sheet 48 at substantially regularly spaced intervals from one another, each one of containers 54 being associated with a corresponding image-receiving area on sheet 48. Each container 54 is provided with a rupturable mouth adapted to eject processing composition onto the image-receiving area of sheet 48 when the container is subjected to compression.

Pressure-applying means are provided for processing latent images in frames of sheet 34 and in this embodiment comprise a pair of rollers 60 and 62 between which sheets 48 and 34 may be advanced in superposed relation with one another. Such advancement causes the processing composition in container 54 to be ejected and spread between the sheets to form a sandwich in which the latent image on sheet 34 is developed and transferred to form a positive print on the image-receiving area of sheet 48.

Roller 60 and roller 62 are provided respectively with pressure-applying surfaces 64 and 66, separated from one another by an interval substantially equal to the combined thickness of sheets 48 and 34 plus a predetermined increment which determines te thickness of the layer of processing composition spread between the sheets. Both rollers are so mounted to be thus separated when portions 42 and 26 of housing 20 are in a closed position.

After being passed between rollers 60 and 62, the compressed sandwich comprising sheet 48 and sheet 34 with the processing composition therebetween may be advanced into processing chamber 40 wherein said sandwich may remain for a predetermined period of time to complete the developing and transferring process. Rear portion 42 of housing 20 may be provided with a light-tight door 68 through which the completed positive print may be removed. The parts of the sandwich remaining after removal of the positive print may be taken from the camera by advancing the sandwich and associated sheets through housing 20 to a slot (not shown) in the lower extremity of housing 20 from whence said parts of the sandwich may extend.

Mechanisms for arresting movement of sheet material as said material is advanced are preferably mounted on rear portion 42 of housing 20 as at 90 and are shown in detail in FIGS. 2 through 5. The mechanisms are adapted for cooperative use with sheet material such as sheet 48 having a succession of pairs of regularly spaced marginal engageable portions such as perforations 94, the perforations 94 of each pair being disposed along opposite marginal portions of sheet 48 from one another, one such pair being associated with each image-receiving area of sheet 48. An example of such a sheet material may be seen in U.S. Patent No. 2,612,452, issued September 30, 1952 to William J. McCune, Jr.

The mechanism for arresting movement of sheet material illustrated in FIG. 2 includes a rigid angled member 100 comprising a central portion 102 across which sheet 48 is adapted to move during advancement, portion 102 having a dimension suitable to accommodating the full width of the sheets. Anchor portion 104 of member 100 is formed to provide means for rigidly attaching member 100 to rear portion 42 of housing 20. Central portion 102 is so provided at each extremity with perforations 110 that perforations 94 in sheet 48 may be positioned in register with perforations 110 at a given stage of advancement of sheet 48. In rear portion 112 of member 100, a pair of openings such as slotted apertures 114 are formed for receiving hinge means integral with rocking member 120. Rocking member 120 comprises a planar portion 122, a pair of ears 124 extending therefrom for insertion in apertures 114 of member 100, and a lever arm 126 extending outwardly from portion 122 parallel to ears 124 to provide a means for pivoting rocking member 120 about a pivotal axis formed when ears 124 are inserted in apertures 114. Rear portion 112 of member 102 is so provided with an aperture such as slot 128 that lever arm 126 may extend therethrough.

A support member 130 (FIG. 2) is adapted to mount a pair of stop means such as pins 132 in such manner as to enable movement of pins 132 in a plurality of directions. Member 130 is preferably composed of a suitable resilient material such as Phosphor bronze or spring steel and comprises means, such as central portion 134, for rigidly attaching support member 130 to planar portion 122 of rocking member 120. Support member 130 comprises an intermediate portion 136 depending angularly from central portion 134 and a pair of resilient portions 138 extending from and being substantially in the plane of central portion 134. A pair of pins 132 are mounted adjacent the extremities of portions 138, said pins comprising stop means for slidable movement within the perforations 110 and 94 formed respectively in rigid angular member 100 and in sheet material 48, said pins having a cross-sectional diameter substantially less than the dimensions of said perforations. Stop pins 132 are so dimensioned as to protrude from portions 138 a distance substantially equal to the combined thickness of sheet 48 and central portion 102 of rigid angle member 100. Extending angularly from each of portions 138 in a direction opposite to portion 136 and in the same plane as portion 138 are wing portions 139. Stop pin detent means for releasably retaining pins 132 against movement opposite to the direction of advancement of sheet 48, such as bars 140, are mounted on and protrude from wings 139 in a direction parallel to stop pins 132 a distance substantially equal to the thickness of central portion 102 of rigid angle member 100. It is apparent that pins 132 and associated bars 140 are movable in one or more directions at the same time because of the resilient qualities of support member 130 and the arrangement of its elements into at least two planes disposed at angles to one another. Further, as support member 130 is rigidly attached to release member 120 which in turn is mounted for pivotal movement on rigid angle member 100, pins 132 mounted on support member 130 are pivotable toward and away from sheet 48 in accordance with rocking movement of member 120. Means for rocking release member 120 and attached support member 130 comprise rocker element 150 extending through opening 152 in and pivotally attached to housing 20, one extremity of element 150 being in slidable contact with cam portion 154 of lever arm 126. Pivotal motion of rocker element 150 moving across cam portion 154 cams lever arm 126 pivotally about the axis defined by ears 124 and apertures 114. A resilient means such as compression spring 160 is so disposed to apply bias to member 120 that portion 122 of member 120 may be positioned adjacent central portion 102 of rigid angle member 100 (as shown in FIGURE 1) and pins 132 and stop pin detent means 140 may protrude through perforations 110 in member 100, stop pins 132 cooperating with perforations 94 in sheet 48.

In operation, pivotal movement of member 120 against the bias of spring 160 moves pins 132 away from member 100. Continued pivotal motion of rocking member 120 moves said member past cam portion 154 of lever arm 126 whereby the bias imposed by spring 160 causes planar portion of member 120 to return to its normal position adjacent member 100. Rocking member 120 and element 150 therefore comprise operable means for disengaging stop pin 132 from perforation 94 to permit continued advancement of sheet 48.

At said normal position of planar portion 120 against member 100, pins 132 protrude through apertures 110 in member 100, and stop pin detent means 140 are in contact with a surface of central portion 102 of rigid angle member 100. As sheet 48 is advanced over central portion 102 of rigid angle member 100, perforations 94 in sheet 48 become aligned with said pins and are engaged thereby. With continued advancement of sheet 48, stop pins 132, in engagement with perforations 94 in sheet 48, are drawn forward parallel to the surface of central portion 102 until arrested by means defining the limit of forward movement of stop pins 132 such as the forward edge 164 of perforations 110 in rigid member 100. The movement of support member 130, responsive to forward movement of stop pins 132 while thus engaged in the perforations 94, results in a forward movement by attached stop pin detent means 140. Stop pin detent means 140 are each spaced from the corresponding stop pins by a distance such that when the forward movement of stop pins 132 is arrested by means defining the limit of said movement, stop pin detent means 140 are no longer in contact with central portion 102 of rigid angle means 100 but instead may now enter perforations 110 in means 100, and are urged into perforations 110 by means of the bias imparted by the resiliency of support member 130.

When stop pins 132 are in the position of forward limitation of movement and the stop pin detent means have entered perforations 110, stop pins 132 cannot be moved in a direction opposite to the direction of advancement of sheet 48, being detained by the locking action of stop pin detent means 140 abutting means for limiting movement of stop pin detent means 140 such as the rearward edge 166 of perforations 110. The construction of support member 130, and more particularly the flexible resilient properties of portions 138 and 136 thereof, enable the aforementioned movement of stop pins 132 relative to perforations 110 and 94, provide a bias for pins 132 in a direction opposite to that in which they are carried, and provide a bias for said pins such that they bear against the surface of sheet material 48 and enter the perforations of said material. The forward movement of pins 132 in engagement with sheet 48 so flex portion 136 of member 130 as to bias said pins in a direction opposite to that in which they are carried by sheet 48. Assuming proper initial registration of the respective leaders of the sheet material, when a pair of perforations 94 are brought adjacent pins 132, a container 54 will automatically be positioned in readiness for placement immediately in advance of the initially exposed area of film. When rocking member 120 is pivoted, pins 132 are caused to be withdrawn from both perforations 110 and perforations 94 and sheet material 48. Immediately upon removal of said pins and stop pin detent means from perforations 110, bias of the flexible intermediate portion 136 of support member 130 causes said stop pins to move rearwardly of perforations 110 and the bias of portions 138 of member 130 causes said pins to return to a position in contact with nonperforated marginal portions of sheet 48, portions 136 and 138 thus comprising means for repositioning pins 132 to a position at which the next successive pair of perforations 94 may be engaged. Upon advancing the materials to a stage whereat the aforesaid exposed frame has been subjected to compression and placed in processing chamber 40, stop pins 132 again enter another pair of perforations 94 and movement of sheet 48 is arrested. The aforesaid procedure may be repeated for each exposed frame of film, the arresting mechanism automatically stopping the sheet materials when an unexposed area of film is positioned in the exposure plane and an exposed and processed area is positioned in the processing chamber 40. A momentary movement of rocking member 120 releases the arresting mechanism, it being unnecessary to hold said rocking means to resume advancement of materials.

Without stop pin detent means and with the use of roller bearings in pressure-applying rollers 60 and 62, the natural resiliency of sheet 48 and the return bias imposed on pins 132 by portion 136 of support member 130 would tend to move sheet 48 oppositely to the normal direction of advancement. If sheet 48 were to so move, stop pins 132 would either re-engage the perforations 94 in sheet 48 immediately upon the release of rocking member 120, or return to a position of contact with unperforated portions of sheet 48 in advance of perforations 94 of the sheet material desired to be then processed. Any subsequent attempt by the operator, believing the stop pin to be disengaged from the sheet material, to advance the sheet material is very likely to result in re-engaging the same perforations 94 again and in tearing the sheet or failure of advancement of the sheet.

Another embodiment of the invention illustrated in FIGS. 4 and 5 has a structure and operates in a manner similar to the stop mechanism disclosed in detail in the aforementioned U.S. Patent No. 2,740,340. The mechanism, adapted for inclusion in a camera in a manner similar to the embodiment shown in FIG. 1, is shown as comprising a rigid angled member 200 which includes a central portion 202 across which sheet 48 is adapted to move during advancement. Portion 202 has a dimension suitable to accommodating the full width of sheet 48. Anchor portion 204 of member 200 is formed to provide means for rigidly attaching member 200 to rear portion 42 of housing 20 in a manner similar to the embodiment shown in FIGS. 1 through 4. Central portion 202 is so provided at each extremity with perforations 206 that perforations 94 in sheet 48 may coincidentally overlay perforations 206 at a given stage of advancement of sheet 48. Anchor portion 204 depends angularly from central portion 202 and is formed to lie substantially in the same plane as central portion 202, thereby providing means for supporting yoke-like element 210.

Yoke-like element 210, rigidly attachable to anchor portion 204, comprises a central portion 212 and means for supporting the extremities of roller 60 such as two forked portions 214 extending angularly from the extremities of central portion 212. Central portion 212 is so dimensioned that when the extremities of roller 60 are engaged in fork portions 214 roller 60 is freely rotatable. Supported on each fork portion 214 is a shouldered stub shaft 216 extending parallel to the longitudinal axis and outwardly from the extremities of central portion 212. Slidably and pivotally mounted on stub shafts 216 is a cradle-like element 220 comprising a rigid longitudinal portion 222 having arms 224 depending angularly from the extremities thereof. Each arm 224 is provided with an aperture 226 therein such as an oval-shaped aperture for slidably and pivotally mounting element 220 on stub shafts 216. The extremity of each arm is shaped to present a nose portion 228 extending along the plane of said arm. Each arm is further provided with an attached finger portion 230 extending angularly of said arm outwardly from and parallel to the plane of longitudinal portion 222. Longitudinal portion 222 is so provided with openings 232 positioned therein that when element 220 is mounted on stub shafts 216 opening 232 may underlie perforations 206 in rigid angled member 200. Underlying element 220 and attached thereto by fastening means such as rivet 236 are a first support means 240 and a second support means 250. First support means 240 comprises a longitudinal member 242 having mounted adjacent the extremities thereof a pair of stop means such as stop pins 244, so disposed that said pins may protrude through openings 232 when means 240 are in an underlying position with respect to element 220. Pins 244 comprise stop means for slidable movement within perforations 206 and 94 formed respectively in rigid member 200 and in sheet material 48, said pins having a cross-sectional diameter substantially less than the dimensions of said perforations. Stop pins 244 are so dimensioned as to protrude from support means 240 a distance substantially equal to the combined thickness of portion 222 of cradle-like element 220, central portion 202 of rigid angled member 200 and sheet 48. Second support means 250 comprises a flexible longitudinal member 252 having mounted adjacent the extremities thereof stop pin detent means such as two bars 254 extending angularly therefrom and being so disposed to extend parallel to stop pins 240 that when second support means 250 are in an underlying position with respect to first support means 240, bars 254 may, simultaneously with pins 244, protrude into perforations 206 in member 200, bars 254 being so dimensioned as to protrude from second support means 250 a distance equal to the combined thickness of central portions 242 of first support means 240, central portion 222 of cradle-like element 220 and central portion 202 of rigid angle member 200. Both first support means 240 and second support means 250 are preferably composed of a suitable resilient material such as Phosphor bronze. It is apparent that the combination of the slidable and pivotal movement of cradle-like member 220 and the resiliency of first support member 240 and second support member 250 allows pins 244 and bars 254 to be movable in one or more directions at the same time.

In operation, cradle-like member 220 may be pivoted by actuating means applying force transversely to nose 228, thereby causing member 220 to pivot about shouldered stub shafts 216. The pivotal movement of member 220 draws associated support members 240 and 250 away from the plane of central portion 202 of rigid angle member 200. Rigid angle member 200 is provided on each side of the central portion thereof with perforated flanges 260, to each of which one end of each of tension springs 262 is attached. The other end of each tension spring 262 is attached to a respective finger 230 of cradle-like member 220. Tension spring 262 comprises means for sliding cradle-like member 220 along shouldered stub shafts 216 in a direction substantially opposite to the direction of advancement of sheet 48. Spring 262 also provides an upward component of force such that cradle-like member 220 is drawn up toward central portion 202 of rigid angle member 200 after pivoting force acting on nose 228 has ceased. Stop pins 244 then protrude through perforations 206 at the rearward portions 264 thereof to contact nonperforated marginal portions of sheet 48. As sheet 48 is advanced over central portion 202 of rigid angle member 200, perforations 94 in sheet 48 are brought into engagement with stop pins 244 which are then drawn forward with the continued advancement of sheet 48 in a direction parallel to the surface of central portion 202 until arrested by means defining the limit of forward movement of stop pins such as the forward edge 266 of perforation 206. Bars 254 which have been in contact with the undersurface of central portion 202 are also drawn forward simultaneously with stop pins 244. The positioning of stop pins 244 against means defining the limit of forward movement thereof allows bars 254 to protrude into perforation 206 in rigid angle member 200, being urged thereinto by the resiliency of second support means 250. As in the previously described embodiment, when pins 244 and bars 254 are in this position, pins 244 are obstructed from any motion oppositely to the direction of advancement in the plane of sheet 48 by bars 254 by which then abut means for retaining movement of stop pin detent means 254 comprising the rearward edge 268 of perforations 206. It is apparent that a repetition of a momentary pivoting force acting on nose 228 will cause bars 254 and pins 244 to be disengaged from perforations 206 and the cycle to be repeated by advancement of sheet material 48.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic apparatus through which may be advanced sheet material having a succession of marginal engageable portions, said apparatus comprising, in combination, a rigid member extending transversely of and for supporting said sheet material, said member having formed therein at least one perforation adapted to be positioned in register with one of said engageable portions of said sheet material, at least one stop member for engaging at a first position said one registered engageable portion, said stop member being movable in engagement with and in the direction of advancement of said sheet material from said first position to a second position where the advancement of said stop member and of said sheet material is arrested, manually operable means for disengaging said stop member from said one portion at said second position to permit continued advancement of said sheet material, stop member detent means so connected with said stop member that only when said stop member is in said second position said detent means protrudes into said perforation to arrest movement of said stop member oppositely to the direction of advancement of said sheet material, said detent means being so mounted as to be withdrawn from said perforation when said stop member is disengaged from said portion and from said perforation, and means for repositioning said stop member to said first position for engagement with the next successive engageable portion of said sheet material.

2. A mechanism for arresting movement of sheet material advanced through a photographic apparatus wherein said sheet material comprises a succession of regularly spaced, marginal, engageable portions, said mechanism comprising a rigid member for supporting said sheet material and having at least one perforation so formed therein as to be registrable with one of said engageable portions, a stop member protruding through said perforation at a first position for engaging a corresponding registered engageable portion, said stop member being movable with said sheet material in the direction of advancement from said first position to a second position where the advancement of said stop member and of said sheet material is arrested, manually operable means for disengaging said stop member from the engaged portion at said second position to permit continued advancement of sheet material, detent means protruding into and so engageable with said perforation when said stop member is in said second position that said stop member is detained from moving oppositely to the direction of advancement, said detent means being so mounted to cooperate with said stop member as to be disengaged from said perforation when said stop member is disengaged from said engageable portion, and means for repositioning said stop member at said first position for engagement with the next successive engageable portion of said sheet material.

3. A mechanism for arresting movement of sheet material advanced through a photographic apparatus wherein said sheet material comprises a succession of regularly spaced, marginal, engageable portions, said mechanism comprising a rigid member for supporting said sheet material and having at least two perforations so formed therein as to be registrable with a pair of said engageable portions disposed on opposite margins of said sheet material, at least a pair of stop pins, each one of said pair of pins protruding through a corresponding perforation when at a first position for engaging a corresponding marginal registered engageable portion, said stop pins being movable with said sheet material when engaged with said sheet material in the direction of advancement from said first position to a second position at which the advancement of said stop pins and said sheet material is arrested, stop pin mounting means for supporting said stop pins and being movable with said sheet material and said pins in the direction of advancement when said pins are engaged in said engageable portions, manually operable means for so moving said mounting means that said stop pins may be withdrawn from engagement with said engageable portions at said second position to permit continued advancement of said sheet material, detent means resiliently attached to said stop pin mounting means and being so movable therewith that said detent means protrude into said perforations only when said stop pins are in said second position, at which second position said detent means restrain the movement of said stop pins in a direction oppositely to the direction of advancement of said stop pins, said detent means so cooperating with said manually operable disengaging means that said detent means are withdrawable from said perforations with the disengagement of said stop pins, and means for moving said stop pin mounting means in a direction substantially opposite the direction of advancement to reposition said stop means for engagement with the next successive marginal engageable portions of said sheet material.

4. A mechanism for arresting movement of sheet material advanced through a photographic apparatus wherein said sheet material comprises a succession of regularly spaced marginal engageable portions, said mechanism comprising a rigid member for supporting said sheet material and having at least two perforations so formed therein as to be registrable with a pair of said engageable portions disposed on opposite margins of said sheet material, at least a pair of stop pins, each one of said pair of pins protruding through a corresponding perforation when at a first position for engaging a corresponding marginal registered engageable portion, said stop pins being movable with said sheet material when in engagement with said engageable portions in the direction of advancement from said first position to a second position at which the advancement of said stop pins and said sheet material is arrested, stop pin mounting means for supporting said stop pins and being movable with said sheet material and said pins in the direction of advancement when said pins are engaged in said engageable portions, means for arresting the advancement of said stop pins at said second position, manually operable means for so moving said mounting means that said stop pins may be withdrawn from engagement with said engageable portions at said second position to permit continued advancement of said sheet material, detent means resiliently attached to said stop pin mounting means and being so movable therewith that said detent means protrude into said perforations only when said stop pins are in said second position, at said second position said detent means being engageable upon marginal portions of each of said perforations to restrain the movement of said stop pins in a direction oppositely to the direction of advancement of said stop pins, said detent means being withdrawable from said perforations substantially simultaneously with the operation of said manually operable disengaging means such that said stop pins are thereby released for movement in a plurality of directions, and means for moving said stop pin mounting means in a direction substantially opposite the direction of advancement to reposition said stop means for engagement with the next successive marginal engageable portions of said sheet material.

5. A mechanism for arresting movement of sheet material advanced through a photographic apparatus wherein said sheet material comprises a succession of regularly spaced marginal engageable portions, said mechanism comprising a rigid member for supporting said sheet material and having at least two perforations so formed therein as to be registrable with a pair of engaged portions disposed on opposite margins of said sheet material, at least a pair of stop pins, each one of said pair of stop pins protruding through a corresponding perforation in said rigid member when at a first position for engaging a corresponding marginal registered engageable portion, said stop pins being movable with said sheet material when in engagement with said sheet material in the direction of advancement from said first position to a second position at which the advancement of said stop pins and said sheet material is arrested, means for arresting said stop pins at said second position, a resilient support member for mounting said stop pins to enable movement of said pins in a plurality of directions, a portion of said support member being movable with said sheet material and said pins in the direction of advancement when said pins are engaged in said engageable portions, manually operable means for so moving said support member that said stop pins may be withdrawn from engagement with said engageable portions at said second position to permit continued advancement of said sheet material, stop pin detent means attached to said support member and protruding therefrom a distance substantially equal to the thickness of said perforations in said rigid member, in a direction parallel to said stop pins, said stop pin detent means being so movable with said support member that said detent means protrude into said perforations only when said stop pins are in said second position, said detent means at said second position being engageable upon marginal portions of each of said perforations to restrain the movement of said stop pins in a direction oppositely to the direction of advancement of said stop pins, said detent means being withdrawable from said perforations substantially simultaneously with the operation of said manually operable disengaging means such that said stop pins are thereby released, and means for moving said support member in a direction opposite the direction of advancement to reposition said stop pins for engagement with the next successive marginal engageable portions of sheet material.

6. A mechanism for arresting movement of sheet material advanced through a photographic apparatus wherein said sheet material comprises a succession of regularly spaced marginal engageable portions, said mechanism comprising a rigid member for supporting said sheet material and having at least two perforations so formed therein as to be registrable with a pair of said engageable portions disposed on opposite margins of said sheet material, at least a pair of stop pins, one of said pair of pins protruding through a corresponding perforation when at a first position for engaging a corresponding marginal registered engageable portion, said stop pins being movable with said sheet material when in engagement with said sheet material in the direction of advancement from said first position to a second position at which the advancement of said stop pins and of said sheet material is arrested, first support means for resiliently mounting said stop pins and being movable with said pins in the direction of advancement when said pins are engaged in said engageable portions, means for arresting the advancement of said stop pins at said second position, manually operable means for so moving said first support means that said stop pins may be withdrawn from engagement with said engageable portion at said second position to permit continued advancement of said sheet material, second support means attached to said manually operable means, detent means resiliently mounted on said second support means and being so movable therewith independently of said stop means that said detent means protrude into said perforations only when said stop pins are in said second position, said detent means being engageable upon marginal portions of each of said perforations at said second position to restrain the movement of said stop pins in a direction opposite the direction of advancement of said stop pins, said detent means being withdrawable from said perforations simultaneously with the operation of said manually operable disengaging means to release said stop pins for movement in a direction opposite the direction of advancement, and means for moving said first support means in a direction substantially opposite the direction of advancement to reposition said stop pins for engagement with the next successive marginal engageable portions of sheet material, and means for moving said second support means in a direction substantially opposite the direction of advancement to so reposition said detent means that said detent means are adjacent said perforations and are protrudable thereinto when said stop pins are again moved into said second position by engagement with said sheet material.

7. A mechanism as defined in claim 6, wherein said means for moving said first support means and for moving said second support means comprises a cradle-like element, and spring means attached at the extremities thereof to said cradle-like element and to said rigid member.

8. A photographic apparatus through which may be advanced sheet material having a plurality of engageable portions, said apparatus comprising, in combination, a first member extending transversely of and for supporting said sheet material, said member having formed therein at least one opening adapted to be aligned with at least one of said engageable portions, at least one stop member for engaging at a first position the aligned one of said engageable portions, said stop member being movable in engagement with and in the direction of advancement of said sheet material from said first position to a second position wherein the advancement of said stop member and of said sheet material is arrested, means for disengaging said stop member from said one portion at said second position to permit continued advancement of said sheet material, stop member detent means so connected with said stop member that only when said stop member is in said second position said detent means cooperates with said first member for restraining said stop member from moving oppositely to the direction of advancement of said sheet material, said detent means being so disposed that when said stop member is disengaged from said portion said detent means no longer restrains said stop member.

9. A photographic apparatus through which may be advanied sheet material having a succession of engageable portions, said apparatus comprising, in combination, a support member for supporting said sheet material, at least one stop member for engaging at a first position at least one of said engageable portions, said stop member being movable relative to said support member in engagement with and in the direction of the advancement of said sheet material from said first position to a second position wherein the advancement of said stop member and said sheet material is arrested by engagement of said stop member with said support member, detent means engageable with said support member for releasably retaining said stop member in said second position against movement oppositely to the direction of advancement of said sheet material, means for disengaging said stop member in said second position from said one portion and said support member to permit continued advancement of said sheet material and for disengaging said detent means from said support member to permit movement of the latter oppositely to the direction of said advancement, and means for repositioning said stop member to said first position for engagement with the next successive engageable portion of said sheet material.

10. In a photographic appartus, the combination as defined in claim 9 including resilient means for mounting said stop member, said member being movable from said first position to said second position against the bias of said resilient means.

References Cited in the file of this patent

UNITED STATES PATENTS

| | | |
|---|---|---|
| 1,386,709 | Jensen | Aug. 9, 1921 |
| 2,789,817 | Sadgebury | Apr. 23, 1957 |
| 2,835,177 | Bishop | May 20, 1958 |